United States Patent
Mori et al.

(10) Patent No.: US 6,777,134 B2
(45) Date of Patent: Aug. 17, 2004

(54) NEGATIVE ELECTRODE FOR RECHARGEABLE BATTERY

(75) Inventors: Mitsuhiro Mori, Tokyo (JP); Hironori Yamamoto, Tokyo (JP); Koji Utsugi, Tokyo (JP); Jiro Iriyama, Tokyo (JP); Tamaki Miura, Tokyo (JP); Mariko Miyachi, Tokyo (JP)

(73) Assignee: NEC Corporation, Tokyo (JP)

( * ) Notice: Subject to any disclaimer, the term of this patent is extended or adjusted under 35 U.S.C. 154(b) by 99 days.

(21) Appl. No.: 10/208,962

(22) Filed: Jul. 31, 2002

(65) Prior Publication Data

US 2003/0036000 A1 Feb. 20, 2003

(30) Foreign Application Priority Data

Jul. 31, 2001 (JP) .......................................... 2001-232716

(51) Int. Cl.⁷ ........................... H01M 4/58; H01M 4/60; H01M 2/16
(52) U.S. Cl. ............................... 429/231.95; 429/231.4; 429/246; 429/213; 429/231.8; 429/231.9; 429/233; 429/245
(58) Field of Search ..................... 429/231.95, 231.4, 429/246, 213, 218.1, 236

(56) References Cited

U.S. PATENT DOCUMENTS 6,402,795 B1 * 6/2002 Chu et al. .................. 29/623.5

FOREIGN PATENT DOCUMENTS

| JP | 7-302617 | 11/1995 |
| JP | 8-250108 | 9/1996 |
| JP | 11-288706 | 10/1999 |

* cited by examiner

Primary Examiner—Carol Chaney
Assistant Examiner—Angela J. Martin
(74) Attorney, Agent, or Firm—Choate, Hall & Stewart

(57) ABSTRACT

A negative electrode for a rechargeable battery including: a current collector, a first layer containing a conductive material to occlude and release lithium ion, the first layer formed on the current collector, a second layer containing a metal selected from lithium and lithium alloy, the second layer formed on the first layer, and a third layer containing a lithium ion conductive material, the third layer formed on the second layer. The third layer prevents the lithium and/or the lithium alloy in the second layer from being in contact with the electrolyte and smoothly feeds the lithium to the second layer to improve the efficiency of the negative electrode. The first layer can occlude and release the part of the lithium to be occluded and released, thereby reducing the volume change of the second layer. Such a structure of the negative electrode enables us to enhance cycling efficiency, and to attain long cycle life and good safety.

17 Claims, 2 Drawing Sheets

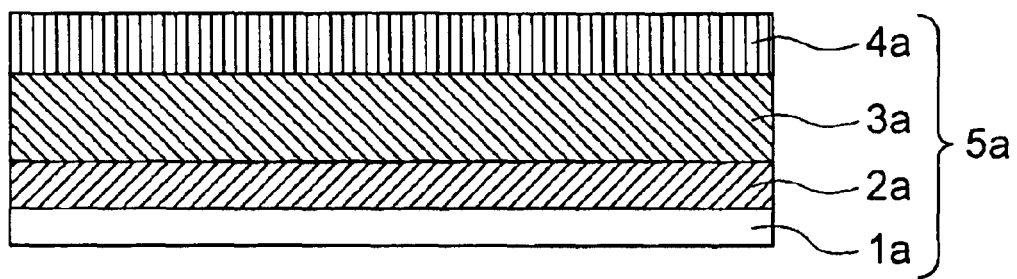
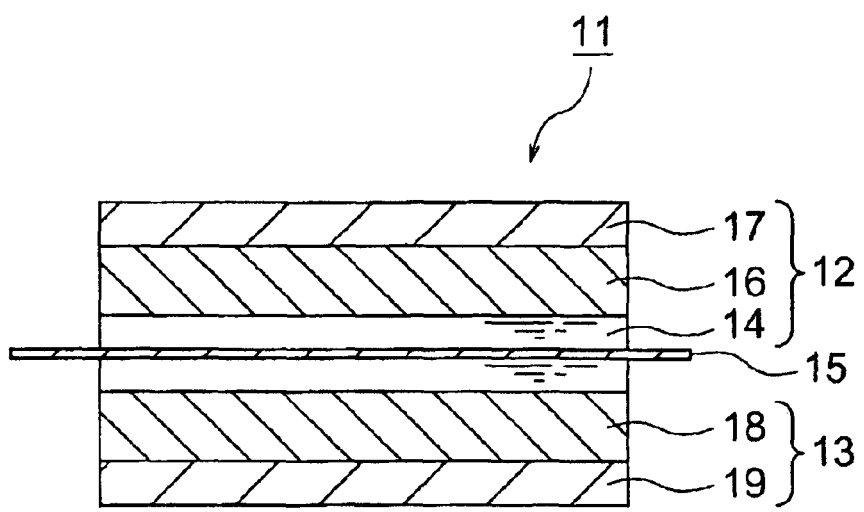

NEGATIVE ELECTRODE FOR RECHARGEABLE BATTERY

BACKGROUND OF THE INVENTION (a) Field of the Invention

The present invention relates to a negative electrode for a rechargeable battery (secondary battery) including lithium metal or lithium alloy as an active material.

(b) Description of the Related Art

Rechargeable batteries using lithium metal and lithium alloy as negative electrodes show superior energy density compared with lithium-ion rechargeable battery using a graphite negative electrode. However, when a negative electrode contains lithium metal as an active, material, some drawbacks for cycling efficiency and safety must be overcome. Due to high chemical activity of lithium, a part of the lithium deposited on the negative electrode in charge process becomes inactivated, and then various lithium compounds like lithium hydroxide, lithium oxide, lithium carbonate, are formed on the electrode surface. Thus, the formed film is composed of various products. Such a non-uniform film gives a localized deposition of lithium on the negative electrode surface. Lithium inactivation induces to lower the cycling efficiency, and the localized deposition of lithium forms dendrite structure, which can cause internal short circuit. The pulverization of the lithium alloy due to a large volume change decreases charge-discharge efficiency (cycling efficiency). The volume change upon cycling must be controlled to materialize a metallic lithium electrode in commercial rechargeable batteries.

Various proposals have been made to overcome the problems for the lithium metal or alloy negative electrode. For instance, some proposals include the suppression of the dendrite growth by a stable film such as lithium fluoride on the electrode surface.

JP-A-7(1995)-302617 describes a lithium negative electrode covered with a lithium fluoride film formed by a reaction between lithium compounds existing on the lithium surface and hydrogen fluoride by means of exposing the lithium electrode to an electrolyte solution containing the hydrogen fluoride. Hydrogen fluoride is generated through a reaction between $LiPF_6$ and a trace amount of water.

Normally, it is quite difficult to obtain a uniform surface film, because active lithium metal reacts with almost all chemical species in an electrolyte solution. The formed film consisting of various compounds is heterogeneous, which are derived from some competitive reactions on the lithium surface. As for topology, dendrite shape forms on the non-uniform surface. In the case of this method for fluoride film formation, hence, it is hardly available to attain a uniform and stable film.

JP-A-8(1996)-250108 describes the formation of lithium fluoride on the surface of a negative electrode by a reaction between a mixed gas containing argon and hydrogen fluoride and aluminum-lithium alloy. However, when another lithium compound exists on the lithium surface in advance and especially a plurality of species are present, the uniform reaction is not likely to proceed, and the uniform lithium fluoride film can be hardly formed. Accordingly, the lithium rechargeable battery with the sufficient cycle characteristics is difficult to be fabricated.

JP-A-11(1999)-288706 describes the formation of a surface film containing sodium chloride as a main component, which has a uniform (100) crystal plane preferentially oriented. In this manner, the uniform deposition and dissolution reaction of lithium suppresses the dendrite formation. Therefore, the cycling efficiency and safety of the battery could be improved. The surface film is desired to contain lithium halide; a solid solution composed of LiF and at least one of the lithium compounds such as LiCl, LiBr and LiI. Preferably, the negative electrode for the non-aqueous electrolyte battery is fabricated by dipping a lithium sheet, having a preferentially oriented (100) crystal surface and formed by rolling, into an electrolyte containing a fluorine molecule or a fluorine ion and at least one of a chlorine molecule or a chlorine ion, a bromine molecule or a bromine ion and an iodine molecule or an iodine ion for forming the solid solution film. In this art, the rolled lithium metal sheet is likely to be exposed to air, thereby forming a film on its surface due to water moisture. Suppression of the dendrite formation is insufficient because the non-uniform chemical compounds hardly give the uniform and stable film on the lithium surface.

Further, the above prior art includes the following common problems.

Although the formation of the lithium halide film on the lithium or lithium alloy layer provides suppression effect of the dendrite formation during the initial stage to some degree, the protection ability of the film decreases gradually upon cycling. This suggests that the internal stress is generated in the lithium halide film by diffusion and/or migration of lithium ions. In other words, the volume of the lithium or lithium alloy layer is changed significantly, due to the occlusion and the release of the lithium, while the volume of lithium halide layer remains unchanged. The internal stress destroys a part of the lithium halide film to lower the suppressing effect of the dendrite formation.

SUMMARY OF THE INVENTION

In view of the foregoing, an object of the present invention is to provide a negative electrode for rechargeable battery which can prevent the dendrite formation in a lithium metal negative electrode for a longer period of time and is excellent in its energy density and cycle life.

The present invention provides a negative electrode for a rechargeable battery including: a current collector, a first layer containing a conductive material to occlude and release lithium ion, the first layer formed on the current collector, a second layer containing a metal selected from lithium and lithium alloy, the second layer formed on the first layer, and a third layer containing a lithium ion conductive material, the third layer formed on the second layer.

In the present invention, the conductive material of the first layer may be replaced with conductive polymer.

In accordance with the present invention, the third layer prevents the lithium and/or the lithium alloy in the second layer from being in contact with the electrolyte and smoothly feeds the lithium to the second layer to improve the efficiency of the negative electrode. In the three-layer structure of the negative electrode, however, the third layer cannot follow the volume change of the second layer. The first layer has relaxation effect to the second layer, which shows a large volume change. That is, the first layer can occlude and release a part of the lithium incorporated in the second layer. This reduces the volume change of the second layer. Such a smaller volume change inhibits to cause pulverization.

The above and other objects, features and advantages of the present invention will be more apparent from the following description.

BRIEF DESCRIPTION OF DRAWINGS

FIG. 1 is a cross sectional view showing an embodiment of a negative electrode of the present invention.

FIG. 2 is a cross sectional view showing an embodiment of a lithium rechargeable battery.

PREFERRED EMBODIMENTS OF THE INVENTION

Figure 3:
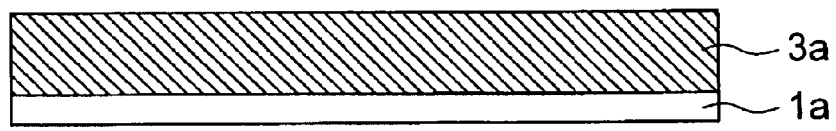
FIG. 3 is a cross sectional view showing the negative electrode of a rechargeable battery in Comparative Example 1.

Now, the present invention is more specifically described.

The negative electrode of the present invention includes a layer structure having a second layer sandwiched between a first layer and a third layer. The third layer allows the lithium to smoothly reach to the second layer and prevents the electrolyte from direct contact with the lithium or the lithium alloy, thereby maintaining the cycling efficiency to be higher and effectively preventing the degradation of the negative electrode such as the dendrite formation.

However, in the structure in which the third layer is present on the second layer, the third layer is affected by the volume change of the second layer, indicating that the protective function is reduced.

Accordingly, the electrode structure in the present invention is composed of the first layer under the second layer in addition to the third layer on the second layer. The first layer made of the material, which ahs lithium storage ability may occlude and release part of the lithium, which is to be occluded and released by the second layer. Accordingly, the volume change of the second layer due to the lithium occlusion and release is reduced to significantly enhance the durability of the negative electrode. The cycle life and the cycling efficiency are remarkably improved by the synergistic effect of the first and the third layers. In other words, the first layer suppresses the capacity change of the second layer by the occlusion and the release of the lithium. This means to inhibit the degradation of the third layer without capacity change.

The first layer interposed between the current collector and the second layer in the negative electrode of the present invention excellently improves the interlayer adhesion of the layer structure including the current collector, the first layer and the second layer. The selection of the material of the first layer such as the carbon having less capacity change due to the occlusion and the release of the lithium than the second layer more significantly improves the adhesion elevating effect. In the first layer, the carbon is preferably contained as a main component. In this text, "main component" refers to a component having a mass % of 50 or more with respect to the total amount.

The conductivity of the material of the first layer maintains the conduction between the lithium-containing layer and the current collector to efficiently prevent the dendrite formation.

In the present invention, the conductive material, which can occlude and release lithium ion of the first layer can be replaced with conductive polymer usually having proper elasticity. The elastic material of the first layer can absorb the distortion energy in the second layer. The first layer keeps the interlayer adhesion force and the durability of the layer structure including the current collector, the first layer and the second layer. The elastic material includes the conducting polymer, having the oxidation-reduction potential close to the operation voltage of the negative electrode, such as polyacetylene, its derivative, polythiophene, its derivative and the conductive polymer prepared by the condensation of quinone-based compound, and further includes polymer compound containing rubber-like material such as styrene, butadiene, polyethylene and polypropylene mixed with an electron-conductive material.

The first layer with the conductive material may include graphite, amorphous carbon, diamond-like carbon, carbon nanotube and the composite thereof. The graphite is preferable among these, because the graphite is excellent in voltage planarization and the adhesiveness with the current collector such as copper. In addition, the graphite contains less impurity than the amorphous material because the graphite is thermally treated at a temperature much higher than that for the amorphous materials.

The second layer occluding and releasing the lithium is made of the lithium alone, or binary or ternary alloy consisting of the lithium and other metals such as Al, Si, Pb, Sn, In, Bi, Ag, Ba, Ca, Hg, Pd, Pt, Te, Zn and La. The amorphous alloy is desirable for the lithium alloy because the amorphous structure hardly generates the degradation such as crystal grain boundary and other defects due to the non-uniformity.

The third layer acting as the protective layer for the second layer prevents the direct contact between the electrolyte and the lithium to maintain the initial battery performance during the repeated charge-discharge cycles. The third layer is preferably made of material having reactivity with the electrolyte lower than the lithium.

The material of the third layer includes lithium carbonate, lithium oxide, lithium sulfide, and lithium halide such as lithium fluoride, lithium chloride, lithium bromide and lithium iodide, and composite thereof. Among these, the lithium halide is the most preferable and the amorphous structure is preferable because the lithium halide is fairly stable, and the amorphous structure hardly generates the degradation such as crystal grain boundary and other defects due to the non-uniformity.

The third layer contains at least two components including solid glassy electrolyte and solid polymer electrolyte. The solid glassy electrolyte includes oxides and sulfides containing at least one of lithium, calcium, sodium, magnesium, beryllium, potassium, silicon, phosphorus, boron, nitrogen, aluminum and transition metals, and more specifically, $SiO_2$, $Li_3PO_4$, $B_2O_3$, $P_2S_5$, $P_2O_5$, $LiSO_4$, $Li_xPO_yN_z$, $Li_2O$ and the composite thereof. The most preferable third layer includes at least one of $Li_2O$, $SiO_2$, $P_2O_5$ and $Li_xPO_yN_z$. The solid polymer electrolyte includes polyethylene oxide (PEO), polypropylene oxide (PPO), polyvinylidene fluoride (PVDF), polyacrylonitrile (PAN) and derivatives thereof. These compounds are desirably amorphous.

In the layer structure of the negative electrode, the second layer is formed on the first layer, and the third layer is formed on the second layer. The third layer preferably forms the surface or the outermost layer. The number of each of the first to third layers can be singular or plural, and for example, the layer structure having the first layer, the second layer, the first layer, the second layer and the third layer stacked in this turn can be used.

Although the entire surface of the second layer is almost covered with the third layer, a partial surface of the second layer may be covered therewith. The first layer is preferably in contact with the second layer, and the third layer is preferably in contact with the second layer. In this layer structure, the volume change of the second layer can be smaller.

The thicknesses of the first and third layers are preferably about 0.1 to 20 $\mu$m, and that of the second layer is preferably about 0.5 to 30 $\mu$m. Around these thicknesses, the extent of the volume change of the second layer is small, and the rechargeable battery can be obtained having the well-balanced energy density, cycle life and efficiency. In the lithium alloy, the lithium content varies from 10% to 90% depending on the progress of the charge and discharge reaction.

The first to third layers can be formed by using various film coating methods including a molten liquid cooling method, a liquid rapid cooling method, an atomize method, a vacuum deposition method, a sputtering method, a plasma CVD method, an optical CVD method, a thermal CVD method and a sol-gel method. The target lithium compound may be incorporated into the electrolyte as an additive generated by a reaction with lithium metal.

The negative electrode in the present invention is excellent in its flexibility with respect to the capacity change of the second layer, the evenness of the ion distribution and the physical and chemical stability, thereby effectively preventing the formation of the dendrite and the pulverization of the lithium to increase the cycle efficiency and the lifetime. The second layer containing the active metallic lithium and sandwiched by the first and third layers suppresses the reaction between the lithium and moisture introduced from the raw material such as the electrolyte, the positive electrode and the separator during the assembly of the battery.

The positive electrode usable in the lithium rechargeable battery of the present invention is obtained by applying, on a substrate such as an aluminum foil, the mixture prepared by dispersing and mixing the positive electrode material, the conductive material such as the carbon black and the bonding agent such as the PVDF with a solvent such as N-methyl-2-pyrrolidone. The positive electrode material includes a composite oxide such as $Li_xMO_2$ (M refers to at least a transition metal) such as $Li_xCoO_2$, $Li_xNiO_2$, $Li_xMn_2O_4$, $Li_xMnO_3$ and $Li_xNi_yCo_{1-y}O_2$, an organic sulfur compound and conductive polymer.

The lithium rechargeable battery of the present invention is fabricated by stacking the negative electrodes and the positive electrodes interposing the separators therebetween followed by winding, if necessary, and accommodating the stacked structure into a battery can or sealing the stacked structure with a flexible film formed by stacking synthetic resin and metal foil. The separator is a porous film made of polyolefin such as polypropylene and polyethylene or fluorocarbon resin.

The solvent containing lithium salt is an organic solvent, which includes cyclic carbonates such as propylene carbonate (PC), ethylene carbonate (EC), butylene carbonate (BC) and vinylene carbonate (VC), linear carbonates such as dimethyl carbonate, diethyl carbonate, ethylmethyl carbonate and dipropyl carbonate (DPC), aliphatic carboxylate esters such as methyl formate, methyl acetate and ethyl propionate, γ-lactones such as γ-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters.

The lithium salt is dissolved into one or more organic solvents. The lithium salt includes $LiPF_6$, $LiAsF_6$, $LiAlCl_4$, $LiClO_4$, $LiBF_4$, $LiSbF_6$, $LiCF_3SO_2$, $LiC_4F_9CO_2$, $LiC(CF_3SO_2)_2$, $LiN(CF_3SO_2)_2$, $LiN(C_2F_5SO_2)_2$, $LiB_{10}Cl_{10}$, lithium lower aliphatic carboxylate, chloloboran lithium, lithium tetraphenylborate, LiBr, LiI, LiSCN, LiCl and imides. Polymer electrolyte may be used in place of the liquid electrolyte.

Although the shape of the rechargeable battery of the present invention is not especially restricted, the cylindrical, the polygonal or the coin-shaped battery is used.

Now, the present invention is more specifically described with reference to accompanying drawings.

As shown in FIG. 1, a negative electrode in accordance with an embodiment of the present invention includes a current collector 1a and a layer structure 5a stacked thereon. The layer structure 5a includes a first layer 2a on the current collector 1a, a second layer on the first layer 2a and a third layer 4a on the second layer 3a.

As shown in FIG. 2, a rechargeable battery 11 includes a positive electrode 12 and a negative electrode 13, which face to each other interposing electrolyte solution 14 and a porous separator 15 located therein. A positive electrode active material-containing layer 16 and a positive electrode current collector 17 to which the positive electrode active material-containing layer 16 is bonded form the positive electrode 12. A negative electrode active material containing layers 18 and a negative electrode current collector 19 to which the negative electrode active material-containing layer 18 is bonded form the negative electrode 13. The porous separator 15 extends nearly parallel to the negative electrode active material-containing layer 18.

EXAMPLES

Examples and Comparative Examples of the negative electrode of the present invention will be described. However, these Examples do not restrict the present invention.

Example 1

Preparation of Negative Electrode

A copper foil obtained by electrolysis having a thickness of 10 $\mu$m was used as the current collector 1a shown in FIG. 1. The first layer 2a was formed by applying a paste to the copper foil 1a followed by drying and compression. The paste was prepared by mixing graphite with poly(vinylidene fluoride) and dissolving the mixture into a solvent (N-methyl-2-pyrrolodon). The second layer 3a and the third layer 4a made of lithium-silicon alloy and lithium fluoride (LiF), respectively, were formed in a vacuum vapor deposition apparatus having a degree of vacuum from $10^{-6}$ to $10^{-5}$ Pa by vacuum-depositing the lithium-silicon alloy or the LiF to a roll having a width of 60 mm by means of electron beam or resistance heating. The capacity of the negative electrode thus formed was the total between the capacity of the graphite and the capacity of the lithium-silicon alloy.

Preparation of Battery

The negative electrode prepared in this manner and a separator having vapor-deposited lithium thereon was welded to a nickel tab to obtain an electric connectivity.

A positive electrode was formed by applying positive electrode paint to the surface of aluminum foil followed by drying and compression. The positive electrode paint was prepared by mixing $Li_xMn_2O_4$ with carbon black and poly (vinylidene fluoride) and dispersing and dissolving the mixture into a solvent (N-methyl-2-pyrrolodon). Then, 1 mol/L of $LiPF_6$ was dissolved into a mixed solvent of ethylene carbonate and diethyl carbonate to provide an electrolyte solution. The negative electrode member and the positive electrode were wound interposing the separator there between to prepare a polygonal rechargeable battery.

Charge and Discharge Cycle Test

A charge rate, a discharge rate, a charge terminating voltage and a discharge terminating voltage were determined to be 1C, 0.5C, 4.3V and 3.0V, respectively. Cycling efficiency is obtained by dividing a discharge capacity (mAh) after 300 cycles by the discharge capacity after 10 cycles. The results obtained in Examples are shown in Table 1.

The initial charge and discharge efficiency and cycling efficiency in Example 1 were significantly higher than those of Comparative Example 1. The improvement of the initial charge and discharge efficiency is probably because the LiF layer existing on the interface suppresses the decomposition of the electrolyte to reduce the irreversible capacity. The improvement of the capacity-maintaining rate is probably because the LiF layer and the graphite layer suppress the volume change due to the charge and the discharge.

Examples 2 to 9

In Examples 2 to 9, the negative electrodes were fabricated by using the materials for the first layer 2a, the second layer 3a and the third layer 4a as specified in Table 1. The discharge depth of the lithium metal negative electrode was adjusted to be 33.3%. The negative electrodes and the batteries of Examples 2 to 9 were evaluated similarly to Example 1, and the results are shown in Table 1.

The initial charge and discharge efficiencies and the capacity-maintaining rates or the cycle characteristics of the batteries of Examples 2 to 9 were improved when compared with those of the following Comparative Examples 1 to 5.

Example 10

A negative electrode was fabricated in accordance with the same conditions as those of Example 1 except that 1 M of $LiN(C_2F_5SO_2)_2$ was dissolved in ethylene carbonate and diethyl carbonate in place of the electrolyte in Example 1, and the materials for the second layer Sa and the third layer 4a were polycrystalline Li—Si alloy and LiF which were introduced therein by the reaction between $N^-(C_2F_5SO_2)_2$ and lithium, respectively. The negative electrode and the battery of Example 10 were evaluated similarly to Example 1, and the results are shown in Table 1.

Similarly to Examples 2 to 9, the initial charge and discharge efficiency and the capacity-maintaining rate or the cycle characteristics of the batteries of Example 10 were improved when compared with those of the following Comparative Examples 1 to 5.

However, both of the initial charge and discharge efficiency and the capacity-maintaining rate of Example 10 were lower than those of Example 1 using the amorphous Li—Si alloy. This proves that the efficiencies of the charge and discharge reaction can be further improved by using the third layer having the amorphous structure without the crystal grain boundary and other defects.

TABLE 1

|  | 2a | 3a | 4a | Initial charge and discharge efficiency (%) | Capacity maintaining rate (%) |
| --- | --- | --- | --- | --- | --- |
| Example 1 | graphite | Li—Si | LiF | 98.9 | 89.4 |
| Example 2 | graphite | Li—Al | $LiF-Li_2CO_3$ | 99.0 | 88.7 |
| Example 3 | graphite | Li—Sn | $SiO_2-Li_2O-P_2S_6$ | 98.4 | 88.6 |
| Example 4 | graphite | Li | $SiO_2-Li_2O-P_2S_6$ | 100.0 | 85.4 |
| Example 5 | amorphous carbon | Li—Si | $LiF-Li_2CO_2$ | 97.8 | 83.2 |
| Example 6 | amorphous carbon | Li—Si | LiF | 92.4 | 84.8 |
| Example 7 | amorphous carbon | Li—Al | $LiF-Li_2CO_8$ | 92.1 | 83.5 |
| Example 8 | amorphous carbon | Li—Sn | $SiO_2-Li_2O-P_2S_6$ | 91.6 | 82.5 |
| Example 9 | amorphous carbon | Li—Si | $SiO_2-Li_2O-P_2S_6$ | 92.9 | 83.8 |
| Example 10 | graphite | Li—Si | LiF | 87.8 | 79.8 |

Comparative Example 1

A battery was fabricated in accordance with the same conditions as those of Example 1 except that lithium-aluminum alloy was used as the second layer 3a of the negative electrode and, as shown in FIG. 3, the second layer 3a was directly formed on the current collector 1a without the first layer. The cycle characteristics of the thus obtained battery were evaluated similarly to Example 1. As shown in Table 2, the initial charge and discharge efficiency was 87.2% and the capacity-maintaining rate was below 10%.

Comparative Examples 2 to 5

Figure 4:
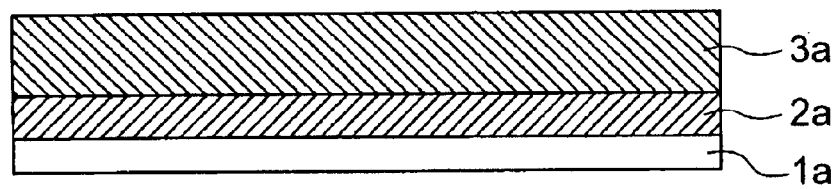
FIG. 4 is a cross sectional view showing the negative electrode of a rechargeable battery in Comparative Example 2.
Figure 5:
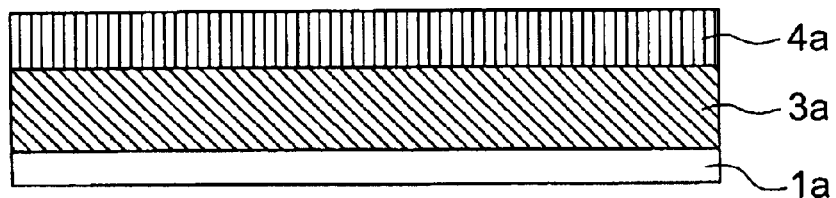
FIG. 5 is a cross sectional view showing the negative electrode of a rechargeable battery in Comparative Example 3.

As shown in FIG. 4 a negative electrode of Comparative Example 2 includes the first layer 2a and the second layer 3a on the current collector 1a, and as shown in FIG. 5 a negative electrode of Comparative Example 3 includes the second layer 3a and the third layer 4a on the current collector 1a.

Batteries of Comparative Examples 2 to 5 were fabricated similarly to Example 1 except that materials forming each of the layers were specified in Table 2. The cycle characteristics of the thus obtained batteries evaluated similarly to Example 1 were shown in Table 2.

TABLE 2

|  | 2a | 3a | 4a | Initial charge and discharge efficiency (%) | Capacity maintaining rate (%) |
| --- | --- | --- | --- | --- | --- |
| Comp. Ex. 1 | — | Li—Al | — | 87.2 | <10 |
| Comp. Ex. 2 | graphite | Li—Si | — | 80.1 | 42.4 |
| Comp. Ex. 3 | — | Li—Si | LiF—Li$_3$CO$_3$ | 79.5 | 45.0 |
| Comp. Ex. 4 | LiAl | graphite | LiF—Li$_2$CO$_3$ | 67.5 | 60.2 |
| Comp. Ex. 5 | SiO$_2$—Li$_2$O—P$_2$S$_6$ | Li—Si | graphite | 94.6 | 78.0 |

Since the above embodiments are described only for examples, the present invention is not limited to the above embodiments and various modifications or alternations can be easily made therefrom by those skilled in the art without departing from the scope of the present invention.

What is claimed is:

1. A negative electrode for a rechargeable battery, comprising:

a current collector;

a first layer containing a conductive material to occlude and release lithium ion, the first layer formed on the current collector;

a second layer containing a metal selected from lithium and lithium alloy, the second layer formed on the first layer, and wherein the second layer is an amorphous layer; and a third layer containing a lithium ion conductive material, the third layer formed on the second layer.

2. The negative electrode as defined in claim 1, wherein the first layer includes a carbon material as a main component.

3. The negative electrode as defined in claim 2, wherein the carbon material is one selected from a group consisting of graphite and amorphous carbon.

4. The negative electrode as defined in claim 1, wherein the third layer contains at least one compound selected from a group consisting of lithium carbonate, lithium oxide, lithium sulfide and lithium halide.

5. The negative electrode as defined in claim 1, wherein the third layer is an amorphous layer.

6. The negative electrode as defined in claim 1, wherein the third layer is a film formed by one method selected from a group consisting of an evaporation, a sputtering, a chemical vapor deposition, and a sol-gel deposition.

7. A lithium rechargeable battery comprising the negative electrode as defined in claim 1.

8. A negative electrode for a rechargeable battery comprising:

a current collector;

a first layer containing a conductive polymer, the first layer formed on the current collector;

a second layer containing a metal selected from lithium and lithium alloy, the second layer formed on the first layer; and a third layer containing a lithium ion conductive material, the third layer formed on the second layer.

9. The negative electrode as defined in claim 8, wherein the conductive polymer is selected from a group consisting of polyacetylene, its derivative, polythiophene, its derivative and a condensate of quinone-based compound.

10. The negative as defined in claim 8, wherein the conductive polymer is a mixture of an electron-conductive material and a rubber-like material.

11. The negative electrode as defined in claim 8, wherein the second layer is an amorphous layer.

12. The negative electrode as defined in claim 8, wherein the first layer includes a carbon material as a main component.

13. The negative electrode as defined in claim 12, wherein the carbon material is one selected from a group consisting of graphite and amorphous carbon.

14. The negative electrode as defined in claim 8, wherein the third layer contains at least one compound selected from a group consisting of lithium carbonate, lithium oxide, lithium sulfide and lithium halide.

15. The negative electrode as defined in claim 8, wherein the third layer is an amorphous layer.

16. The negative electrode as defined in claim 8, wherein the third layer is a film formed by one method selected from a group consisting of an evaporation, a sputtering, a chemical vapor deposition and a sol-gel deposition.

17. A lithium rechargeable battery comprising the negative electrode as defined in claim 8.

* * * * *